United States Patent [19]

Bokalot

[11] Patent Number: 4,552,326
[45] Date of Patent: Nov. 12, 1985

[54] SAFETY DEVICE FOR OPENING AN OUTWARDLY OPENING AIRCRAFT DOOR IN THE EVENT OF EXCESS PRESSURE INSIDE THIS AIRCRAFT AND DOOR EQUIPPED THEREWITH

[75] Inventor: Jean Bokalot, Toulouse, France

[73] Assignee: Societe Nationale Industrielle et Aerospatiale, Paris, France

[21] Appl. No.: 624,816

[22] Filed: Jun. 26, 1984

[30] Foreign Application Priority Data

Jul. 8, 1983 [FR] France .............................. 83 11451

[51] Int. Cl.[4] ................................................ B64C 1/14
[52] U.S. Cl. .................................. 244/129.5; 49/246; 49/276
[58] Field of Search ............... 244/129.5; 49/246, 276, 49/248, 249; 137/81.1; 109/62; 292/D65, 21, 92; 98/1.5

[56] References Cited
U.S. PATENT DOCUMENTS

| | | | |
|---|---|---|---|
| 2,577,697 | 12/1951 | Castle | 244/129.5 |
| 2,748,855 | 6/1956 | Siems et al. | 244/129.5 |
| 2,797,884 | 7/1957 | Peed, Jr. | 244/129.5 |
| 3,085,297 | 4/1963 | Linderfelt | 49/276 |
| 4,042,193 | 8/1977 | Cerne | 244/129.5 |
| 4,102,011 | 7/1978 | Clack, Jr. | 244/129.5 |
| 4,497,462 | 2/1985 | Hamatani | 244/129.5 |

Primary Examiner—Galen L. Barefoot
Attorney, Agent, or Firm—Fisher, Christen & Sabol

[57] ABSTRACT

The invention relates to a safety device for an aircraft door opening outwardly by a preliminary movement enabling stops borne by said door to be disengaged from stops borne by the frame thereof, after which complete opening of the door is obtained by a simple thrust or pull, wherein said safety device comprises at least one mobile lock and one stop, one mounted on the door and the other on the frame thereof and adapted to cooperate with one another to interrupt the prior movement of disengagement of the stops on the door and the stops on the frame, and said mobile lock is controlled by manometric means receiving the pressures inside and outside the aircraft.

7 Claims, 8 Drawing Figures

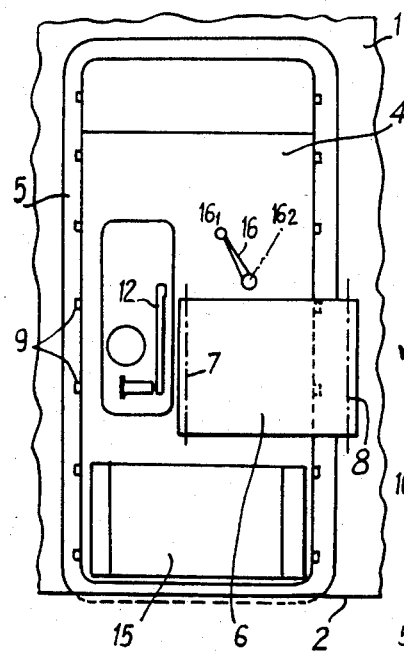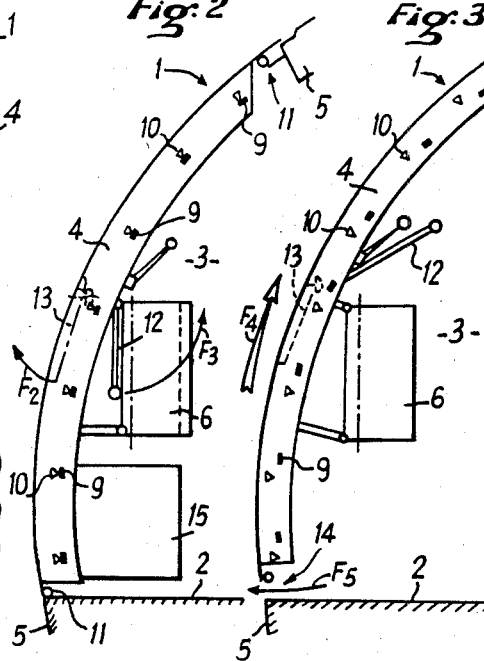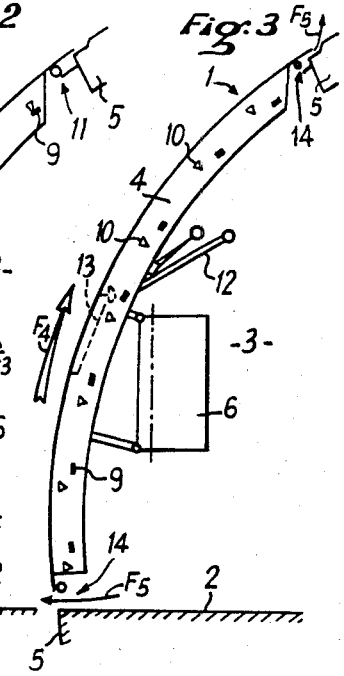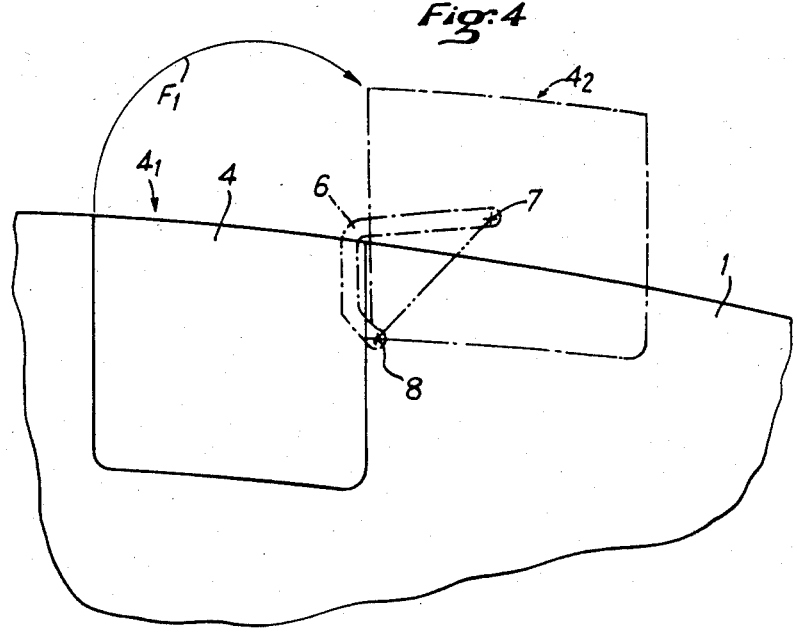

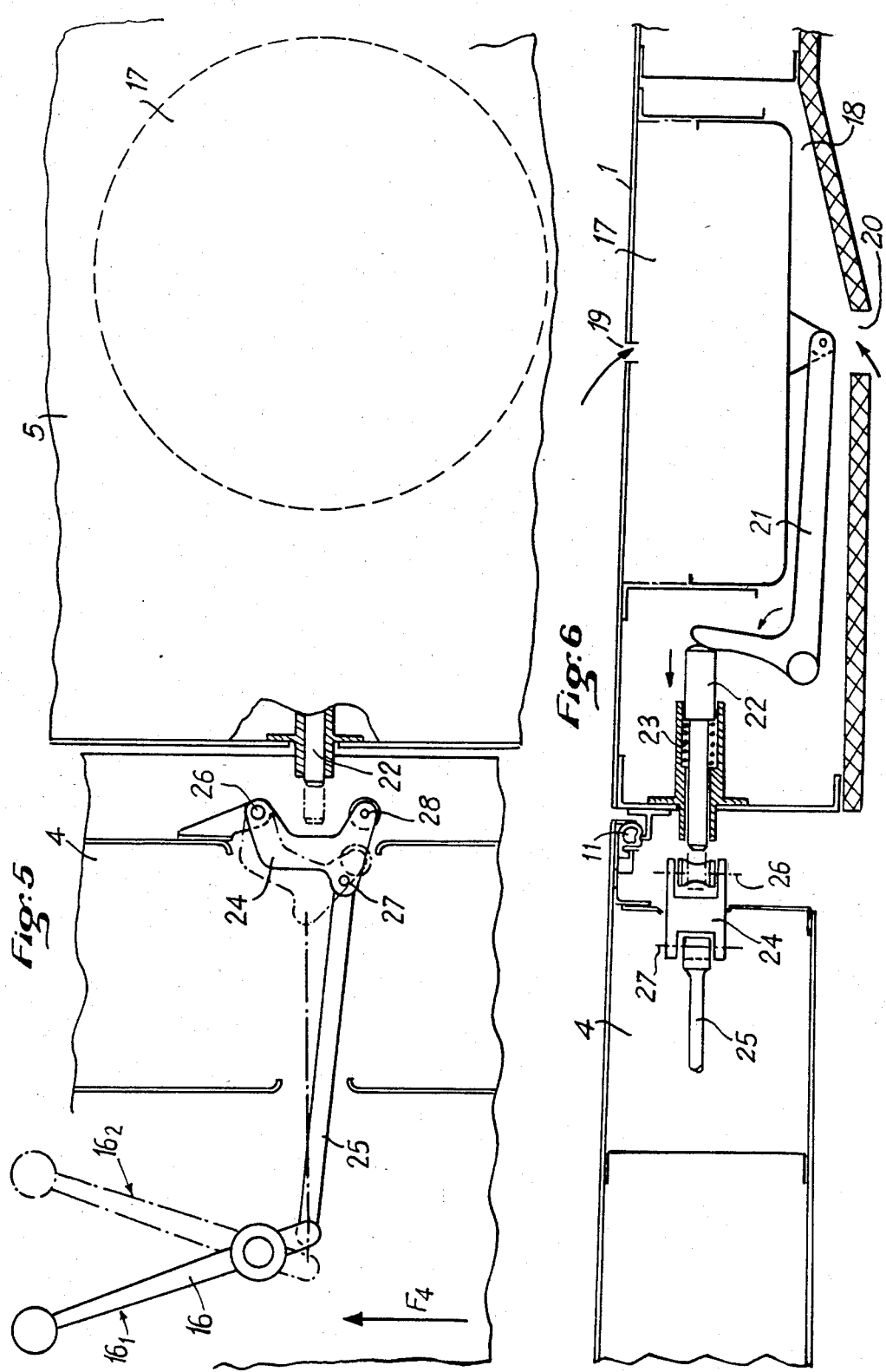

SAFETY DEVICE FOR OPENING AN OUTWARDLY OPENING AIRCRAFT DOOR IN THE EVENT OF EXCESS PRESSURE INSIDE THIS AIRCRAFT AND DOOR EQUIPPED THEREWITH

The present invention relates to a safety device operating when outwardly opening aircraft doors open up in the event of excess pressure inside this aircraft. It also relates to a door provided with such a safety device.

An aircraft door and its frame are known to comprise stops cooperating to oppose the forces of ejection of said door outwardly and, when the door is in closed position, the stops thereof are in abutment against the stops of said frame. To open such an aircraft door, it is necessary to begin by imparting a preliminary movement thereto (of direction substantially parallel to said door) enabling the stops that it bears to be disengaged from the stops of the frame. After this movement of disengagement of the cooperating stops, a simple thrust or pull allows complete opening of the door, generally in a curved translation movement. The movement of disengagement of the cooperating stops may generally be controlled via an inside handle, accessible to the crew members, and by an outside handle accessible to airport ground staff, these inside and outside handles being situated on the door itself.

Furthermore, aircraft capable of flying at high altitudes in the rarefied atmosphere are known to be provided with a system for pressurizing at least a part of their volume (the cabin) in order to maintain a normal pressure therein. Bleed valves are provided for the internal pressure in the aircraft to be returned to that prevailing at ground level when the aircrft lands after a flight with pressurization. However, it may happen that an excess pressure prevails inside the aircraft when the handle for opening a door is actuated, generally due to defective operation of these bleed valves. Even if such an excess pressure is relatively low, it exerts on the door a considerable outward force, due to the large surface of the aircraft doors. As soon as the door is disengaged from the stops on its frame, it therefore opens suddenly under the thrust created by the excess pressure. Such a sudden opening risks injuring any one standing on either side of the door.

It is an object of the present invention to overcome these drawbacks by providing a safety device capable of eliminating the effects of such a residual excess pressure inside an aircraft when the doors are opened.

To this end, according to the invention, the safety device for an aircraft door opening outwardly by a preliminary movement enabling stops borne by said door to be disengaged from stops borne by the frame thereof, after which a simple thrust or pull allows the door to be opened completely, is noteworthy in that it comprises at least one mobile lock and one stop, one mounted on the door and the other on the frame thereof and adapted to cooperate with one another to interrupt the prior movement of disengagement of the stops on the door and the stops on its frame, and in that said mobile lock is controlled by manometric means receiving the inside and outside pressures of the aircraft, so that said mobile lock takes a retracted position, for which it cannot cooperate with said stop when said inside pressure is substantially equal to the outside pressure, and a projecting position for which it can cooperate with said stop when said inside pressure is greater than the outside pressure.

In the event of excess pressure inside the aircraft, the preliminary movement is thus stopped by the cooperation of the mobile lock and of the stop and the door cannot open completely in sudden fashion. On the other hand, as the prior movement is effected at least partly, air communication slots appear between the door and its frame, with the result that the air under excess pressure inside the aircraft may escape towards the outside. As soon as the inside and outside pressures have become substantially equal, the manometric means retract the mobile lock and the door can continue to be opened without danger.

In order to avoid triggering off the safety device according to the invention for slight pressure differences, said manometric means are preferably adjusted so that said mobile lock can be controlled towards its projecting position only when the inside pressure exceeds the outside pressure by a determined threshold. Such a threshold may for example be fixed at about 2 mb.

The present invention may be applied to the different doors of an aircraft. However, it is particularly advantageous for the passenger cabin doors. Such doors are generally provided, in addition to the normal opening means, with emergency opening means controlled by a special handle in order to be able to open rapidly in case of need. Moreover, the emergency opening of a door generally involves the unfurling of an escape slide, which is normally folded up and contained in a box fast with said door. It is therefore indispensable that the safety device according to the invention cannot hinder or prevent emergency opening of such a door.

According to another feature of the present invention, applied to a door having to be able to open rapidly in case of need, by actuation of a special handle, the safety device comprises means for inhibiting the action of said mobile lock, controlled by said special handle.

In a first embodiment, such inhibiting means may result from the fact that said stop is mounted so as to be retractable under the action of the special handle.

In a second embodiment, the safety device comprises a distributor actuated by said special handle and adapted to inhibit the action of the manometric means. Moreover, said special handle may be connected to said mobile lock in order to be able to return it from its projecting position to its retracted position. In the latter case, the connection between the special handle and the mobile lock is sliding in order to allow said mobile lock to take its projecting position, under the action of the manometric means, when the special handle is not actuated. Such a sliding connection may be such that, if the mobile lock is in projecting position when the special handle is actuated, this handle begins by inhibiting the action of the manometric means, then returns the mobile lock into retracted position. This connection may be of the slotted slide type.

The invention will be more readily understood on reading the following description with reference to the accompanying drawings, in which:

FIG. 1 is a view showing, from the interior of an aircraft, a passenger cabin door in closed position.

FIG. 2 is a schematic end view of the closed door of FIG. 1.

FIG. 3 is a schematic end view, comparable with FIG. 2, of the door of FIG. 1 in the course of opening, during the preliminary phase of disengagement of the door stops from the frame stops.

FIG. 4 illustrates, in plan view, the movement of opening of the door of FIGS. 1 to 3.

FIG. 5 is a schematic front view of an embodiment of the safety device according to the invention.

FIG. 6 is a plan view of the embodiment of FIG. 5.

In these Figures, like references designate like elements.

Figure 7:
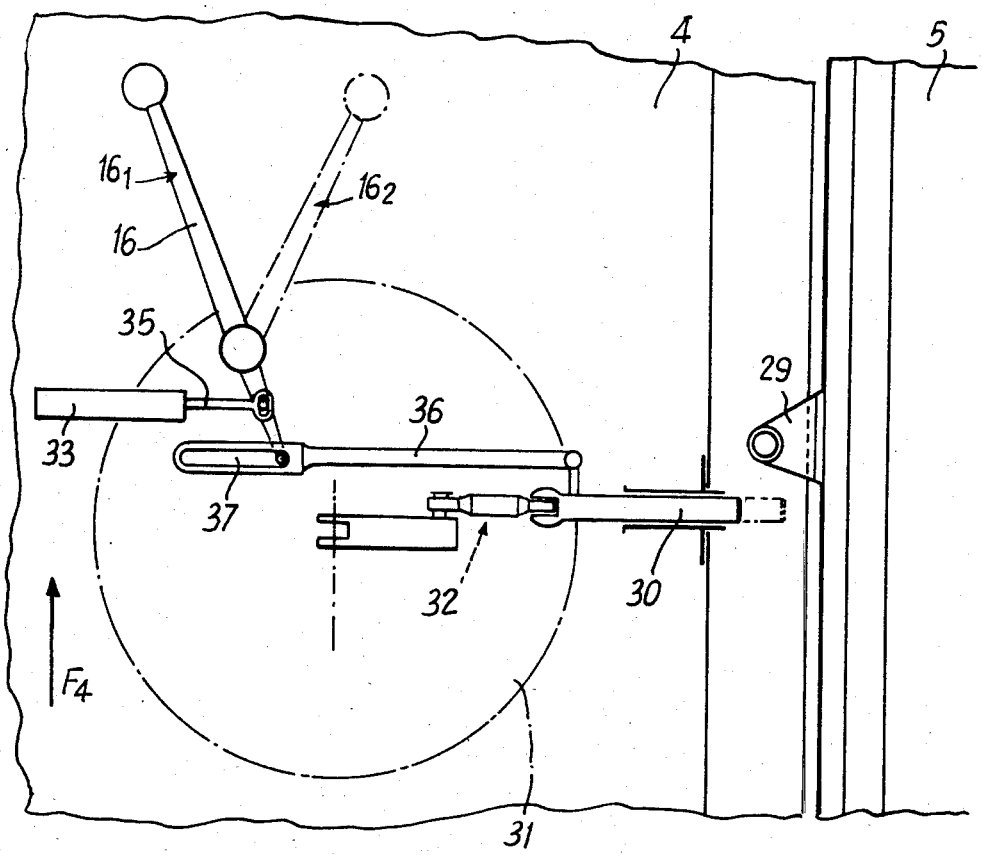
FIG. 7 is a schematic front view of a variant embodiment of the safety device according to the invention.

Referring now to the drawings, the portion of fuselage 1, shown in FIGS. 1 to 4, defines, with a floor 2, a conventional passenger cabin 3 of an aircraft. This cabin 3 is shown in the vicinity of a door 4 and the frame 5 thereof and a hinge system 6 enables the door 4 to pass, by a movement at least approximately assimilable to a curved translation (arrow $F_1$) from a position $4_1$ of closure to a position $4_2$ of opening (cf. FIG. 4). The door 4 opens outwardly of the fuselage 1 and the hinge system 6 comprises two pivot pins 7 and 8, substantially vertical, of which one (7) is connected to the door 4 and the other (8) to the frame 5.

The door 4 comprises a plurality of peripheral stops 9 which, in closed position $4_1$ of the door 4 (cf. FIG. 2), engage behind corresponding peripheral stops 10 on the frame 5. In this way, the door 4 is guaranteed against the risks of ejection outwardly of the aircraft when the latter is flying in rarefied atmosphere, whilst the cabin 3 is pressurized. A sealing system 11 is provided on the periphery of the door 4 so that, in closed position $4_1$, no air can leak between said door and its frame 5.

Opening and closure of the door 4 are controlled by an inner handle 12 and an outer handle 13 themselves actuating a mechanism of known type (not shown in the drawings). From the closed position $4_1$ (cf. FIGS. 1, 2 and 4), manoeuvring of the handle 12 or the handle 13 (arrows $F_2$ and $F_3$ of FIG. 2) begins by communicating to the door 4 a relative movement (arrow $F_4$ of FIG. 3) adapted to disengage the stops 9 of door 4 from stops 10 of frame 5 and of which the general direction is parallel to the curved surface in which the contact faces of the stops 9 and 10 lie. As soon as this preliminary movement $F_4$ has been made, a simple thrust from the inside or a simple pull from the outside enables the door 4 to be opened and brought into its position $4_2$ of maximum opening (arrow $F_1$).

It will be readily understood that, if a residual excess pressure prevails in the cabin 3 with respect to outside the aircraft, the door 4 will pass suddenly to its position $4_2$ under the action of such excess pressure, as soon as the door stops 9 are disengaged from the frame stops 10, further to the preliminary movement in the direction of arrow $F_4$. During this sudden opening, the door 4 might injure any one standing either outside or inside the aircraft. It is an object of the invention to avoid these drawbacks and to prevent the door 4 from suddenly leaving its frame 5. To this end, according to the invention, in the event of internal excess pressure, the preliminary movement of disengagement of the door 4 made in the direction of arrow $F_4$ is interrupted and temporarily blocked the instant a sufficient slot 14 appears between said door 4 and its frame 5 (cf. FIG. 3). In this way, the inside air under excess pressure may escape to the outside (arrows $F_5$) so that equilibrium is rapidly obtained between the pressures inside and outside the aircraft.

FIGS. 5 to 8 show two variant embodiments of the device according to the invention for obtaining this result and applied to the particular case of the door 4 being conventionally equipped with an unfurlable emergency escape slide 15. In this case, it is known that the opening of the door 4 followed by the unfurling of the escape slide 15 is controlled by the manoeuvring handle 12 and with the same effects mentioned above; however, it is necessary to have preselected emergency opening by means of a handle 16 (which controls a known device not shown in the drawings), which may take either a normal position $16_1$ for which the door 4 is opened without unfurling of the slide 15, or an emergency position $16_2$ for which the door 4 is opened with unfurling of the slide 15.

In a variant, emergency opening might be entirely automated and controlled by handle 16 alone when it reaches its position $16_2$.

The particular embodiments given by way of example in FIGS. 5 to 8, thus depend on the lever 16.

The embodiment shown in FIGS. 5 and 6 comprises a manometric capsule element 17 enclosed in a box 18 connected to the frame 5. Via orifices 19 and 20, the capsule element 17 receives the pressure outside the aircraft and the pressure inside the cabin 3, respectively. The capsule element 17 controls, via a lever 21, a mobile lock 22 subjected to the action of a spring 23 pressing it against said lever 21. Thus, when the pressure outside the aircraft and the pressure inside the cabin are substantially equal, the mobile lock 22 occupies a retracted position (shown in solid lines in FIGS. 5 and 6), particularly under the action of spring 23 which does not meet with any resistance from the lever 21 controlled by the capsule element 17. On the other hand, when the pressure inside the cabin 3 is greater than the pressure outside the aircraft, for example by approximately 2 mb, the capsule element 17 causes the lever 21 to tip and to push the mobile lock 22 in the direction of the door 4 and against the action of the spring 23. The mobile lock 22 then takes the projecting position shown in broken lines.

Furthermore, opposite the mobile lock 22 is located a retractable stop 24 connected by a rod to lever 16. The retractable stop 24 is in the form of a crescent and is articulated at one of its tips, at 26, on the door 4. Furthermore, the retractable stop 24 is articulated by its back, at 27, on the rod 25. In this way, when the lever 16 is in its position $16_1$, the stop 24 is in projecting position (shown in solid lines in the Figures) for which the lock 22 lies opposite the hollow of the crescent. On the other hand, when the lever 16 is in position $16_2$, the stop 24 is in retracted position (shown in solid lines in FIG. 5) and is out of reach of the mobile lock 22, even in projecting position.

The device of FIGS. 5 and 6 operates as follows:

1. —in the event of normal opening of door 4 by means of a handle 12 or 13, the lever 16 is in position $16_1$, so that the retractable stop 24 occupies its projecting position. Two cases may then present themselves:

(a) if the pressure inside cabin 3 is substantially equal to the pressure outside the aircraft (or at least is not greater by more than the threshold of 2 mb), the lock 22 is in its retracted position escaping the stop 24, even in projecting position, so that the movement of disengagement of the stops 9 and 10 is effected normally and, after this disengagement, door 4 may be brought into open position $4_2$ by simple thrust or pull;

(b) if the pressure inside cabin 3 is greater than the pressure outside the aircraft by a value higher than said threshold of 2 mb, the lock 22 is in its projecting position and its end therefore lies between the tips of the retractable stop 24, likewise in projecting position. Consequently, the movement of disengagement of the stops 9 and 10 is blocked by the cooperation of the end of the mobile lock 22 and of the tip 28 of the stop 24, opposite the articulation 26. In this blocked position, door 4 has moved sufficiently for the slots 14 to have appeared, i.e. for the air in excess pressure inside the cabin to be evacuated to the outside. As soon as the inside and outside pressures are equalized, the capsule element 17 controls retraction of the lock 22 so that the end thereof may escape the tip 28. Door 4 then continues to be opened until position $4_2$ is reached.

2. —in the event of emergency opening of door 4 by means of handle 12 with preselection by means of handle 16, the latter is then in its position $16_2$, with the result that stop 24 is in retracted position.

Whatever the position of the mobile lock 22 (projecting or retracted), its end then escapes the tip 28 of the retractable stop 24 and door 4 opens in emergency, independently of the relative pressure values inside and outside the aircraft.

Figure 8:
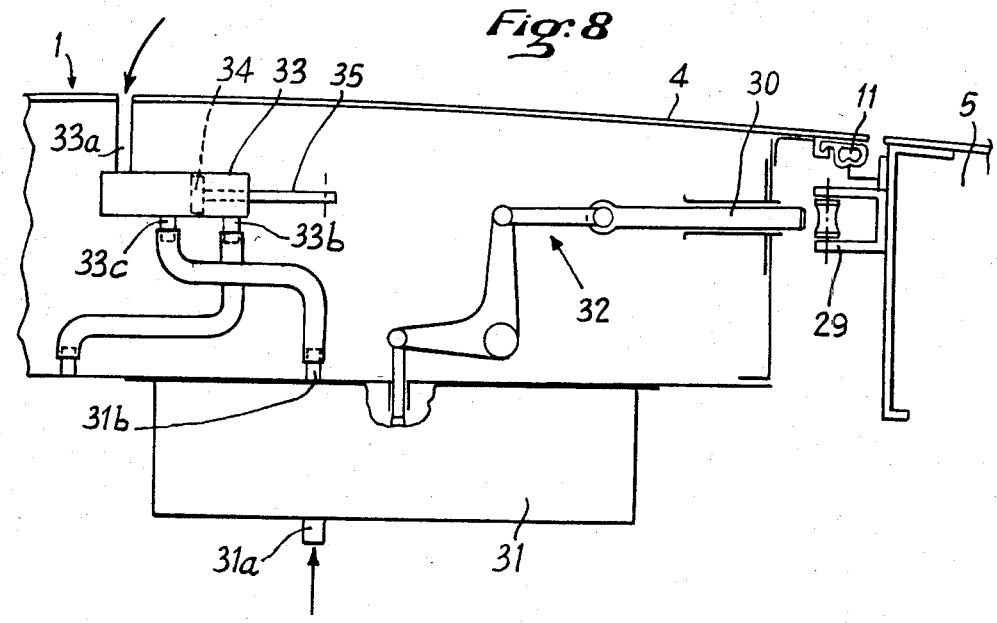
FIG. 8 is a plan view of the embodiment of FIG. 7.

The variant embodiment of the device according to the invention, shown in FIGS. 7 and 8, provides a fixed stop 29, mounted on frame 5, and a mobile lock 30, mounted on door 4 and controlled by a manometric capsule element 31, via a rod 32. One of the inlets 31a of the manometric capsule element 31 permanently receives the pressure of cabin 3. On the other hand, the other inlet 31b of said manometric capsule element 31 is adapted to receive either the pressure outside the aircraft, or the pressure of cabin 3. To this end, a distributor 33 is provided, comprising an inlet 33a receiving the pressure outside the aircraft, an inlet 33b receiving the pressure inside the cabin 3, an outlet 33c connected to the inlet 31b of the manometric capsule element 31 and a piston 34 capable of placing outlet 33c in communication either with the inlet 33a or with inlet 33b. The piston 34 is provided with a piston rod 35 articulated on lever 16.

When lever 16 is in position $16_1$, the piston 34 causes inlet 33a to communicate with outlet 33c of the distributor 33, so that the inlet 31b of the manometric capsule element 31 receives the pressure outside the aircraft. On the other hand, when the lever 16 is in its position $16_2$, the piston 34 causes the inlet 33b to communicate with the outlet 33c of the distributor 33, so that the inlet 31b of the manometric capsule element 31 receives the pressure inside the cabin 3.

Furthermore, lock 30 is connected to lever 16 by a slide 36 provided with a slot 37 in which the lever 16 may slide.

The device of FIGS. 7 and 8 operates as follows:

1. —in the event of normal opening of door 4 by means of a handle 12 or 13, the lever 16 is in position $16_1$, with the result that distributor 33 addresses the outside pressure to the inlet 31b of the manometric capsule element 31. Two cases may then present themselves:

(a) if the pressure inside cabin 3 is substantially equal to the pressure outside the aircraft (or at least is not greater by more than the threshold of 2 mb), lock 30 is controlled by the capsule element 31 to its retracted position (shown in solid lines in the Figures) escaping the stop 29, so that the movement of disengagement of stops 9 and 10 is effected normally and, after this disengagement, door 4 may be taken to open position $4_2$ by simple thrust or pull;

(b) if the pressure inside cabin 3 is greater than the pressure outside the aircraft by a value greater than said threshold of 2 mb, lock 30 is in its projecting position (shown in broken lines in FIG. 7) and its end passes beyond the plumb of the fixed stop 29. Consequently, the movement of disengagement of the stops 9 and 10 is blocked by the cooperation of the mobile lock 30 and the stop 29. The air inside cabin 3 under excess pressure escapes via slots 14 and as soon as the inside and outside pressures are equalized, the capsule element 31 controls retraction of lock 30 via rod 32, so that it may escape stop 29. Door 4 may then be continued to be opened until position $4_2$ is reached.

2. —In the event of emergency opening of door 4, handle 16 is passed from position $16_1$ to position $16_2$, this resulting in two actions:

(a) firstly, the distributor is controlled by handle 16 to cause inlet 33b to communicate with outlet 33c. The manometric capsule element 31 therefore receives the pressure of the cabin on these two inlets 31a and 31b and retracts lock 30 if the latter was in projecting position or maintains it in retracted position.

(b) moreover, if lock 30 was in projecting position, the action on handle 16 then retracts it in forced manner via slide 36. If the lock was already in retracted position, handle 16 simply moves in slot 37 in slide 36. As soon as handle 16 has reached position $16_2$, lock 30 is in any case blocked in retracted position.

In this way, whatever the initial position of lock 30, door 4 can be opened without hindrance in an emergency.

Although the embodiments shown in the drawings have illustrated the application of the invention to doors equipped with an emergency opening device, it goes without saying that the invention is not limited to this type of door.

What is claimed is:

1. Safety device for an aircraft door opening outwardly by a preliminary movement enabling stops borne by said door to be disengaged from stops borne by the frame thereof, after which complete opening of the door is obtained by a simple thrust or pull, said safety device comprising at least one mobile lock and one stop, one mounted on the door and the other on the frame thereof and adapted to cooperate with one another to interrupt the prior movement of disengagement of the stops on the door and the stops on the frame, said mobile lock being controlled by manometric means receiving the pressures inside and outside of the aircraft, so that said mobile lock takes a retracted position, for which it cannot cooperate with said stop when said inside pressure is substantially equal to the outside pressure, and a projecting position for which it can cooperate with said stop when said inside pressure is greater than the outside pressure, said safety device being applied to said door, which has to be able to open quickly if necessary, by actuation of a special handle, and there being means adapted to inhibit the action of said mobile lock and controlled by said special handle.

2. The safety device of claim 1 wherein said stop is mounted so as to be retractable under the action of the special handle.

3. The safety device of claim 1 wherein there is a distributor actuated by said special handle and capable of inhibiting the action of the manometric means.

4. The safety device of claim 3 wherein the special handle is connected to said mobile lock so as to be able to return the safety device from its projecting position to its retracted position.

5. The safety device of claim 4 wherein the connection between the special handle and the mobile lock is sliding in order to allow said mobile lock to take its projecting position, under the action of the manometric means when the special handle is not actuated.

6. The safety device of claim 5 wherein said sliding connection is such that, if the mobile lock is in projecting position when the special handle is actuated, this handle begins by inhibiting the action of the manometric means, then returns the mobile lock into retracted position.

7. The safety device of claim 6 wherein said sliding connection is of the slide type provided with a slot.I

* * * * *